Nov. 13, 1951 — D. N. MEYERS — 2,574,651
SUSTAINING ROTOR BLADE
Filed May 2, 1947
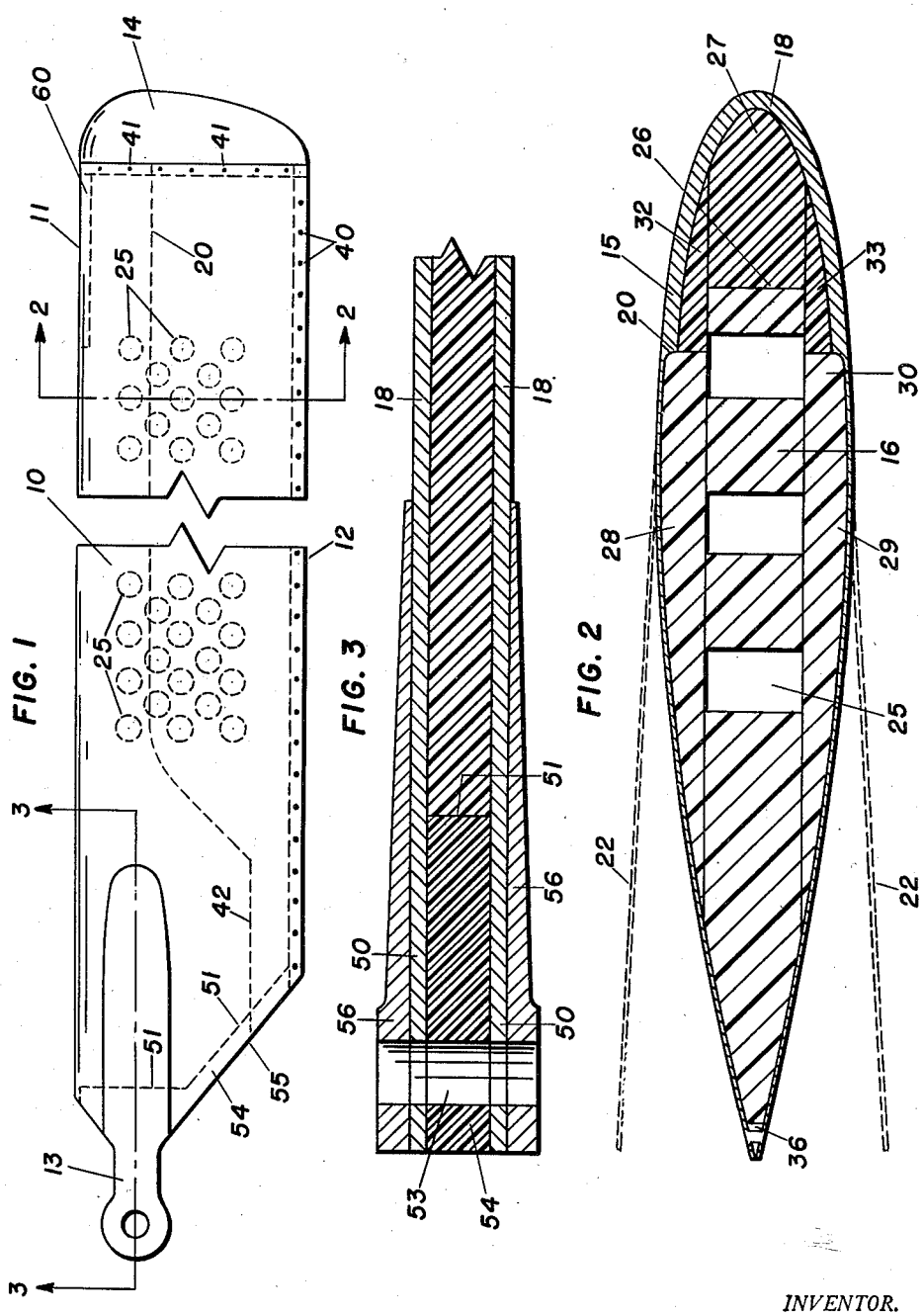
INVENTOR.
DONALD N. MEYERS Patented Nov. 13, 1951

2,574,651

UNITED STATES PATENT OFFICE 2,574,651

SUSTAINING ROTOR BLADE

Donald N. Meyers, Philadelphia, Pa., assignor, by mesne assignments, to Piasecki Helicopter Corporation, Morton, Pa., a corporation of Pennsylvania Application May 2, 1947, Serial No. 745,504

3 Claims. (Cl. 170—159)

This invention relates to blades for the sustaining rotors of aircraft and to methods of manufacturing the same.

It is a general object of the present invention to provide novel and improved constructions and methods of manufacture for the blades of sustaining rotors for aircraft.

More particularly it is an object of the invention to provide a completely sheathed blade of the stressed skin type wherein the entire structural portion of the blade is formed from a single piece of sheet metal which is tapered both chordwise and spanwise to adjust the thickness as required for strength distribution and blade balance.

An important object of the invention comprises the formation of a rotor blade of the type described from a preformed cellular core and a one piece metal covering completely bonded thereto throughout its whole inner area.

Another important object of the invention consists in the provision of a rotor blade of the type described formed from a single sheet of metal contoured into a stressed skin, the nose section of which is relatively stiff and strong and the trailing section of which is only thick enough to resist the relatively light loads on the after part of the blade and to provide weather sealing and protection for a cellular core which imparts dimensional stability to the assembly.

One of the important features of the invention resides in the preforming of a single sheet to desired thicknesses throughout various portions of its area so that when contoured into a stressed skin it provides strength where needed, weight distribution for blade balance and protective covering in other areas for a stiffening core bonded to the whole inner area of the sheet.

Another important feature of the invention resides in the use of a single sheet of stressed skin in which the thickness and weight of the metal in the nose section provides rigidity and strength by a spar-like arrangement and where added weight is provided in the nose section to effect balance about the pitching axis of the blade by the use of a stiffener core whose leading edge section is formed of denser material than the remainder thereof.

In the core structure uniqueness of arrangement is achieved through laminar construction whereby one or more inner plies may be perforated for reduction in weight and certain plies may be of composite construction making use of materials of different densities.

As a further feature of the invention may be mentioned the method of assembly, including the formation of the metal sheet to desired thicknesses while in the flat and the contouring of the heavy weighted nose portion with the trailing section skins spaced apart and in the flat, the accurate shaping of the core section to the configuration of the whole interior of the skin when the exterior thereof is contoured to the desired airfoil shape, the insertion of the core into the nose section and the contouring of the skins thereto, followed by a bonding operation joining the core and the whole inner area of the stressed sheet.

A further unique feature of the invention comprises the integral formation of the stressed skin and root sections to eliminate discontinuities and notch concentrations which might lead to fatigue failure.

Other and further objects and features of the invention will be more apparent to those skilled in the art upon a consideration of the accompanying drawing and following specification wherein is disclosed a single exemplary embodiment of the invention, with the understanding that modifications in the construction and procedure may be made such as fall within the scope of the appended claims without departing from the spirit of the invention.

In said drawings:

Fig. 1 is a plan view of a blade constructed in accordance with the present invention, certain interior portions being indicated in dotted lines;

Fig. 2 is a transverse section showing the airfoil form of the blade taken on line 2—2 of Fig. 1, this section being shown on an enlarged scale; and Fig. 3 is a fragmentary longitudinal section on the pitching axis through the root portion of the blade taken on line 3—3 of Fig. 1 and shown on an enlarged scale.

In the construction of blades for rotors for sustaining aircraft or for providing both sustaining and propulsion for such craft, the important features involve: simplicity; ease of assembly; reduction or elimination of stress points caused by discontinuities of the skin at junction points, rivet holes and the like; exterior surface adapted to contouring to exact airfoil section with complete surface smoothness throughout all vital areas; rigidity achieved without excess weight; dimensional stability; and strength.

In accordance with the present invention extreme simplicity of construction is achieved from using only two major portions, a stressed skin providing the necessary mechanical strength against all but shear stresses and a cellular core affording dimensional stability to the skin and resisting shear loads. Maximum structural efficiency is thereby achieved. The skin is formed into a completely monocoque airfoil shell from a single sheet of suitable metal tapered in thickness both spanwise and chordwise and bent to contour with the leading edge and adjacent nose section formed from the thickest part of the sheet. This thick portion of the sheet extends inboard beyond the airfoil to form basic portions of the root end fitting whereby there are no discontinuities to lead to fatigue failure.

Contour is accurately maintained by a cellular core of plastic material which is sealed entirely inside of the metal to prevent moisture absorption. Chordwise balance of the blade is achieved both by tapering the thickness of the skin and by using a core of greater density in the nose section than in other portions of the blade or entirely by controlling the thickness of the metal in the nose section.

The blade shown in the present invention is substantially rectangular in plan and is of symmetrical airfoil section, although neither of these are requirements for the application of the invention. The blade may be of uniform transverse section throughout its length or may vary in thickness. It is preferably of uniform width and has at least a straight leading edge.

Referring now to the drawings, it will be seen that the blade 10 is substantially rectangular in plan having a straight leading edge 11 and straight trailing edge 12, a root end fitting 13 and a separate tip 14. As shown in solid lines in Fig. 2, the blade is in section a thin airfoil, preferably of the NACA 00 family, 0012, for instance, although variations in this have no bearing on the invention. The blade comprises two essential portions, a metal skin 15 of true monocoque construction and cellular core 16 filling substantially the entire interior thereof. The two parts are suitably bonded together throughout the whole inner area of the skin.

The blade must have strength, both spanwise and chordwise, to resist loadings when stationary, when idling and when sustaining. The blade is given suitable design strength to resist the known loads primarily by varying the thickness of the single metal sheet forming the stressed skin as required. Such a sheet is of any suitable alloy.

As shown at 18 in Fig. 2 the metal in the nose portion is relatively thick and this thickness extends over the major forward section. As shown by the dotted line 20 in Fig. 1, relatively thick metal occupies at least all of the area forward of the pitching axis of the blade while aft of the line 20 the metal is of relative thinness to act principally as a weatherproof covering or skin for the core.

Although shown as of uniform thickness throughout the nose section 18 and from the line 20 to the trailing edge, the metal of each of the major sections of the skin may be tapered both chordwise and spanwise to achieve the desired strength distribution and rigidity characteristics as well as to contribute to the balance of the blade about the pitching axis.

The single sheet of metal from which the skin is constructed is machined in the flat by mounting on a perforated bed where it is held in position by suction. The designed thickness of metal is then produced by careful machining using a milling process, which can be controlled to close tolerances. The portion of the metal sheet which will form the nose section of the blade is then bent to contour accurately to the desired airfoil while the thin sections of the sheet are allowed to remain flat, as indicated by the dotted lines 22 in Fig. 2.

The core 16 is now formed from a suitable cellular plastic material having the desired rigidity and lightness. It is preferably made from laminae suitably bonded together in order to achieve lightness by introducing a plurality of perforations 25 in one or more plies, as clearly seen in Figs. 1 and 2. As shown the perforations are uniformly scattered in only the center ply, which is of about one-half the total thickness of the core. The major portion of the center ply some of which is perforated extends from the trailing edge to about the position indicated by reference character 26. This ply of minimum density then has applied to its forward edge the section 27 of greater density selected to determine the balance of the blade as previously mentioned. Outer plies 28 and 29 of low density material are now applied over the center layer to close off the perforations and each extends toward the nose section to the line 30, which is toward the trailing edge from 26 as shown, to permit overlapping of the small sections of the outer plies 32 and 33, which are of the dense material and the center. They thus serve to reinforce the abutted junction of the two densities of the intermediate ply and also provide added weight when needed. It is possible to entirely omit the more dense portions of the core, leaving the nose section of the skin hollow and to provide the desired balance by increasing the thickness of the metal where necessary.

While it would be possible to mold the core to the desired configuration which the interior of the skin finally achieves when its exterior is exactly contoured to the desired airfoil, it is found more desirable to produce this core contour by machining, and this is done in the preferred arrangement. When the core is completed, it, or the interior of the skin, or both, is coated with a suitable bonding adhesive or cement and the parts are assembled as shown in Fig. 2.

The core at this time may be fitted with a trailing edge reinforcing strip 36 in the form of a triangular section of metal to which the trailing edges of the skin are subsequently riveted. The skin sections 22 are now formed down over the core and the whole blade preferably encased in a two-part mold to insure the exact exterior configuration of the same. If the type of cement requiring heating has been used, such heating is applied with pressure to insure the bonding of the core and skin throughout the whole inner area of the latter. When the blade is removed from the mold, rivets 40 are secured through the trailing edges of the skin and the filler piece 36 to secure the parts together mechanically. The bonding cement, however, is applied to all faying surfaces before their assembly and fastening. Because of the general configuration of the blade it is more convenient to provide the tip 14 as a separate deep drawn shell attached by rivets 41, as shown.

The heavy gauge metal 18 of the nose section of the blade is first widened as at 42 near the base of the blade to provide stiffness and strength and is then reduced in width at the root to form the major portions of the root end fitting. These skin sections are illustrated at 50 in Fig. 3 and are shown as parallel to each other and spaced over the core, which stops at 51. To space the root tabs 50 apart to provide extra rigidity and strength for the pin which passes through the drag axis bore 53, a rigid plastic spacer and filler 54 is abutted against the core at line 51, which is preferably substantially at right angles to the pitching axis where it crosses the same and is then bent outwardly to follow the blade inner end contour 55. This filler extends clear to the trailing edge 12, as clearly seen in dotted lines in Fig. 1 and is securely bonded in position at the time of assembling the blade.

Because the skin sheet has been considerably reduced in width to form the root fitting, it is then reinforced by a pair of strengthening and stiffening doubler plates 56, which taper, as shown, to provide considerable thickness surrounding the opening for the drag axis pin. These are securely bonded to the skin so as to be attached throughout their areas.

It will be seen that the construction just described and the method of assembling it, while subject to some modifications, defines a blade with a minimum number of parts and one in which the skin of the nose section is in effect a spar whose strength at any section can be exactly matched to the stress there occurring, by determining the required thickness of the skin prior to machining. Balance which is so essential to the proper operation of a blade of this type can be effected in several ways, including variations in the thickness of the skin and/or in the density of the core material, as well as by the addition of concentrated weights if desired, as shown, for instance, at 60 in Fig. 1. These may be riveted or welded to the skin or embedded in the core. By carefully bonding at all meeting edges and surfaces all moisture can be excluded from the cellular core, which is preferably made of a synthetic resin of the cellulose acetate type, which, while less subject to moisture absorption than, for instance, Balsa wood, nevertheless would have its density changed if it were permitted to absorb moisture. The outer skin completely protects it from this and is so formed that it has the least number of parts and the least number of stress raisers caused by discontinuities, such as attachment points.

I claim:

1. A blade for a sustaining rotor for aircraft comprising, in combination, a preformed airfoil shaped core of light weight, rigid, cellular, plastic material and a unitary metal covering bonded to said core throughout its whole outer surface, said core including a plurality of laminae, at least an inner one of which is provided over a large central area with lightening holes, at least one of said laminae having its leading edge portion of greater density than the remainder solely for balance purposes, said metal covering comprising a single sheet curved about the leading edge of the core and forming a nose section of a thickness throughout to constitute a cantilever spar to carry the full blade loading, said sheet being abruptly reduced in thickness at the trailing edge of the spar section to provide a weatherproof skin for the trailing section of a thickness requiring the support of the core to retain dimensional stability.

2. The blade as defined in claim 1 in which the thick spar portion of the metal sheet is increased in width chordwise near and at the root, said core being fitted with a rigid spacer positioned between the root ends of the spar portion, and reinforcing plates bonded to said portions of increased width and forming therewith a drag pivot bearing.

3. A blade for a sustaining rotor for aircraft comprising, in combination, a preformed airfoil shaped core of light weight, rigid, cellular, plastic material and a unitary metal covering bonded to said core throughout its whole outer surface, said core including a leading edge portion of greater density than the remainder for blade balancing, said covering comprising a single sheet curved at the leading edge to form a nose portion of U-section, the metal therein being of substantially uniform thickness chordwise but tapering spanwise and sized to constitute a cantilever spar to carry the full blade loading, said sheet being abruptly reduced at the trailing edges of the nose portion to provide only a weatherproof skin for the core trailing portion of a thickness requiring support by the core for dimensional stability.

DONALD N. MEYERS.

REFERENCES CITED

The following references are of record in the file of this patent:

UNITED STATES PATENTS

| Number | Name | Date |
| --- | --- | --- |
| 1,785,543 | Dornier | Dec. 16, 1930 |
| 1,790,213 | Gwaltney | Jan. 27, 1931 |
| 1,843,886 | Semmes | Feb. 2, 1932 |
| 2,152,861 | Bennett | Apr. 4, 1939 |
| 2,248,221 | Dornier | July 8, 1941 |
| 2,268,049 | McGuire | Dec. 30, 1941 |
| 2,303,707 | Pullin | Dec. 1, 1942 |
| 2,364,610 | Archer | Dec. 12, 1944 |
| 2,376,653 | Boyer | May 22, 1945 |
| 2,377,846 | Dreyfus et al. | June 5, 1945 |
| 2,407,867 | Buchanan | Sept. 17, 1946 |
| 2,412,908 | Platt | Dec. 17, 1946 |
| 2,414,125 | Rheinfrank, Jr. | Jan. 14, 1947 |
| 2,426,130 | Wald | Aug. 19, 1947 |
| 2,463,101 | Greutjen | Mar. 1, 1949 |
| 2,484,141 | Alex | Oct. 11, 1949 |

FOREIGN PATENTS

| Number | Country | Date |
| --- | --- | --- |
| 124,253 | Great Britain | Mar. 13, 1919 |
| 417,139 | Great Britain | Sept. 28, 1934 |